United States Patent
Koyama et al.

(10) Patent No.: US 12,397,853 B2
(45) Date of Patent: Aug. 26, 2025

(54) VEHICLE ATTITUDE CONTROL DEVICE

(71) Applicant: Honda Motor Co., Ltd., Tokyo (JP)

(72) Inventors: Ryo Koyama, Tokyo (JP); Masayuki Kikuchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 18/407,316

(22) Filed: Jan. 8, 2024

(65) Prior Publication Data
US 2024/0278828 A1 Aug. 22, 2024

(30) Foreign Application Priority Data
Feb. 16, 2023 (CN) .......................... 202310122702.6

(51) Int. Cl.
*B62D 6/00* (2006.01)
(52) U.S. Cl.
CPC .............. *B62D 6/003* (2013.01); *B62D 6/006* (2013.01)
(58) Field of Classification Search
CPC ..... B62D 6/003; B62D 6/006; B60W 30/045; B60W 40/068; B60W 40/10; B60W 2520/10; B60W 2520/125; B60W 2540/18

USPC ................................ 701/41, 42, 43, 44, 70
See application file for complete search history.

(56) References Cited

U.S. PATENT DOCUMENTS

2004/0153228 A1* 8/2004 Matsumoto ......... B60T 8/17552
701/91

FOREIGN PATENT DOCUMENTS

WO 2017051870 3/2017

* cited by examiner

*Primary Examiner* — Hai H Huynh
(74) *Attorney, Agent, or Firm* — JCIPRNET

(57) ABSTRACT

A vehicle attitude control device includes: a vehicle speed detector, detecting a vehicle speed; a travel road surface condition estimator, estimating a road friction coefficient; an actual yaw rate detector, detecting an actual yaw rate; a front wheel steering angle detector, detecting a front wheel steering angle; a standard yaw rate calculator, setting a rear wheel sideslip angle limit value, calculating a front wheel steering angle limit value according to the vehicle speed, the road friction coefficient and the rear wheel sideslip angle limit value, and calculating a standard yaw rate based on the front wheel steering angle and the vehicle speed, in which the front wheel steering angle is limited by the front wheel steering angle limit value; and a yaw moment calculator, generating a yaw moment based on a deviation between the actual yaw rate and the standard yaw rate.

3 Claims, 3 Drawing Sheets

VEHICLE ATTITUDE CONTROL DEVICE

CROSS-REFERENCE TO RELATED APPLICATIONS

This application claims the priority benefit of China Application No. 202310122702.6, filed on Feb. 16, 2023. The entirety of the above-mentioned patent application is hereby incorporated by reference herein and made a part of this specification.

BACKGROUND

Technical Field

The disclosure relates to a control device, in particular to a vehicle attitude control device.

Related Art

In recent years, initiatives to provide access to sustainable transportation systems that take into account vulnerable persons such as the middle-aged and the elderly among traffic participants are becoming active. In order to achieve this, research and development for improving traffic safety or convenience have been conducted through the development related to behavioral stability of a vehicle.

When a vehicle is disturbed by steering or road surface disturbance, the attitude of the vehicle body needs to be controlled to enable stable traveling of the vehicle. WO2017/051870 describes increasing the yaw moment based on a steering angle according to a deviation between a standard yaw rate and an actual yaw rate. Since this behavior is unable to respond to steering on a road having a low friction coefficient, there is a possibility of overturning the steering wheel. At this time, the standard yaw rate calculated based on the steering angle increases, and the yaw moment on a bending side controlled by yaw rate feedback (FB) may become excessively large.

Conventionally, the yaw rate feedback is controlled by the standard yaw rate and lateral acceleration. However, a lateral acceleration sensor is relatively likely to be affected by road surface disturbance and contain a lot of noise. Thus, a threshold for starting response delay and restriction needs to be widened for filtering processing. As a result, since a standard behavior is restricted later than an appropriate timing, the behavior of the vehicle becomes unstable. Accordingly, it is desirable to improve responsiveness on a road having a low friction coefficient.

In terms of vehicle traveling stability, how to reduce unstable vehicle behavior on a road having a low friction coefficient has become a problem to be solved for those skilled in the art.

SUMMARY

A vehicle attitude control device includes a vehicle speed detector, a travel road surface condition estimator, an actual yaw rate detector, a front wheel steering angle detector, a standard yaw rate calculator, and a yaw moment calculator. The vehicle speed detector detects a vehicle speed of a vehicle. The travel road surface condition estimator estimates a road friction coefficient. The actual yaw rate detector detects an actual yaw rate of the vehicle. The front wheel steering angle detector detects a front wheel steering angle of the vehicle. The standard yaw rate calculator sets a rear wheel sideslip angle limit value of the vehicle, calculates a front wheel steering angle limit value according to the vehicle speed, the road friction coefficient and the rear wheel sideslip angle limit value, and calculates a standard yaw rate based on the front wheel steering angle and the vehicle speed, in which the front wheel steering angle is limited by the front wheel steering angle limit value. The yaw moment calculator generates a yaw moment based on a deviation between the actual yaw rate and the standard yaw rate.

DESCRIPTION OF THE EMBODIMENTS

Figure 1:
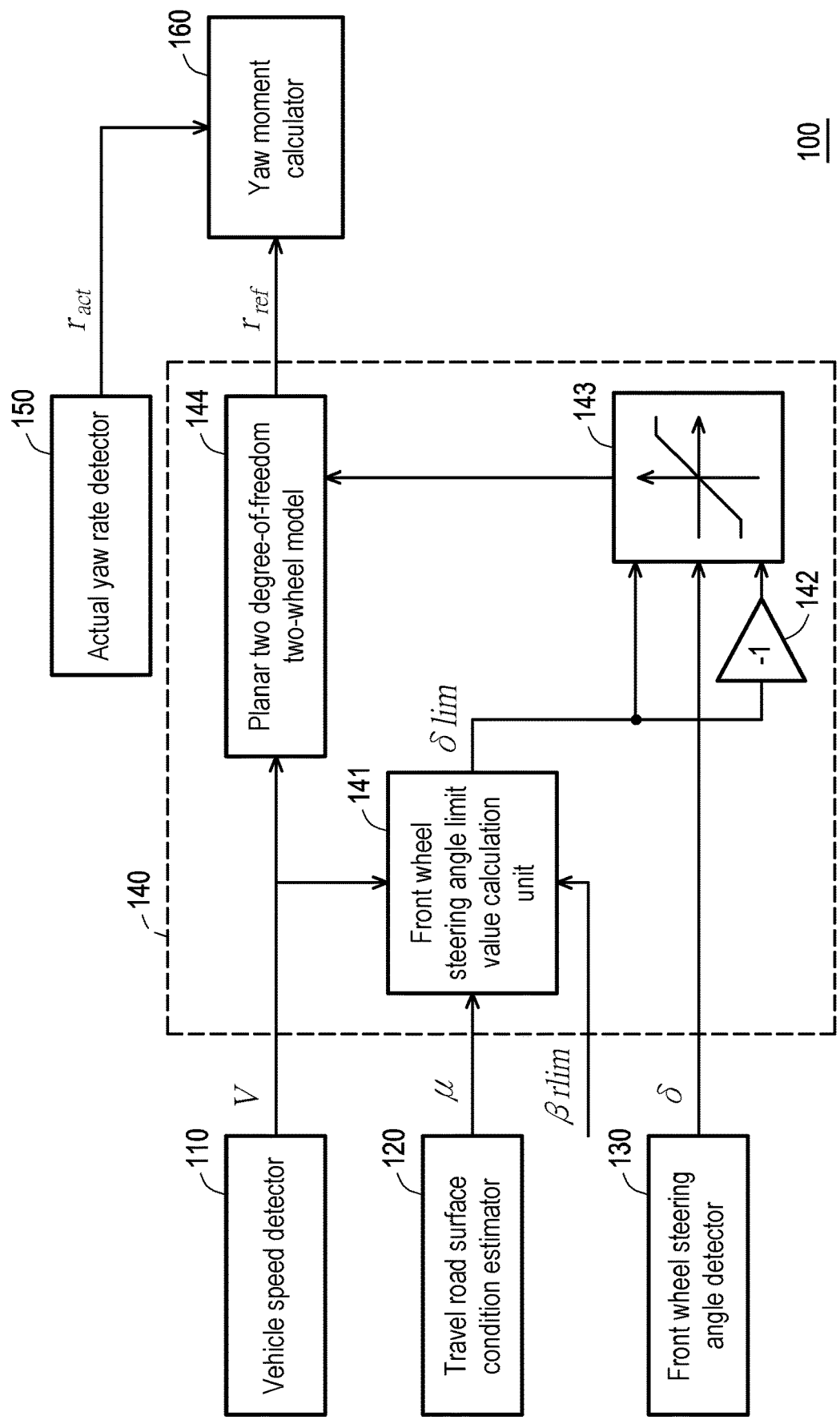
FIG. 1 illustrates a schematic block diagram of a vehicle attitude control device according to one embodiment of the disclosure.

In the disclosure, not only responsiveness of a vehicle on a road having a low friction coefficient can be improved, but also stable traveling of the vehicle can be achieved, which further contribute to the development of a sustainable transportation system.

The disclosure provides a vehicle attitude control device. The vehicle attitude control device includes a vehicle speed detector, a travel road surface condition estimator, an actual yaw rate detector, a front wheel steering angle detector, a standard yaw rate calculator, and a yaw moment calculator. The vehicle speed detector detects a vehicle speed of a vehicle. The travel road surface condition estimator estimates a road friction coefficient. The actual yaw rate detector detects an actual yaw rate of the vehicle. The front wheel steering angle detector detects a front wheel steering angle of the vehicle. The standard yaw rate calculator sets a rear wheel sideslip angle limit value of the vehicle, calculates a front wheel steering angle limit value according to the vehicle speed, the road friction coefficient and the rear wheel sideslip angle limit value, and calculates a standard yaw rate based on the front wheel steering angle and the vehicle speed, in which the front wheel steering angle is limited by the front wheel steering angle limit value. The yaw moment calculator generates a yaw moment based on a deviation between the actual yaw rate and the standard yaw rate.

According to the above structure, the front wheel steering angle is limited based on the rear wheel sideslip angle limit value, and the standard yaw rate is calculated based on the front wheel steering angle and the vehicle speed. Thereby, the vehicle can be prevented from becoming unstable due to an excessively large yaw moment on a road having a low friction coefficient. Furthermore, compared to the case of using a lateral acceleration sensor, the responsiveness of the vehicle can be improved.

In one embodiment of the disclosure, the standard yaw rate calculator may set the front wheel steering angle limit value to increase as the rear wheel sideslip angle limit value increases.

According to the above structure, by setting a relatively large front wheel steering angle limit value as the rear wheel sideslip angle limit value increases, and calculating the standard yaw rate using this front wheel steering angle limit value, unstable behavior of the vehicle on a road having a low friction coefficient can be quickly prevented.

In one embodiment of the disclosure, the standard yaw rate calculator may calculate the front wheel steering angle limit value using a deviation between a plurality of transfer characteristics according to the vehicle speed and the road friction coefficient and the rear wheel sideslip angle limit value.

According to the above structure, the front wheel steering angle limit value can be easily calculated using the vehicle speed, the road friction coefficient, and the rear wheel sideslip angle limit value, and thus, unstable behavior of the vehicle can be quickly prevented.

Based on the above, in the vehicle attitude control device of the disclosure, the standard yaw rate calculator calculates the standard yaw rate based on the vehicle speed, the road friction coefficient and the rear wheel sideslip angle limit value. By limiting the front wheel steering angle based on the rear wheel sideslip angle limit value, and calculating the standard yaw rate based on the front wheel steering angle and the vehicle speed, vehicle behavior can be prevented from being adversely affected by an excessively large yaw moment.

Reference will now be made in detail to the exemplary embodiments of the disclosure, examples of which are illustrated in the accompanying drawings. Wherever possible, the same reference numerals are used in the drawings and the description to refer to the same or like portions.

FIG. 1 illustrates a schematic block diagram of a vehicle attitude control device according to one embodiment of the disclosure. Referring to FIG. 1, a vehicle attitude control device 100 is, for example, disposed in a vehicle to control traveling of the vehicle. In the present embodiment, examples of the vehicle include a car powered by an internal combustion engine such as a diesel engine or a gasoline engine, an electric car powered by an electric motor, and a hybrid car having both an internal combustion engine and an electric motor.

As illustrated in FIG. 1, the vehicle attitude control device 100 includes a vehicle speed detector 110, a travel road surface condition estimator 120, a front wheel steering angle detector 130, a standard yaw rate calculator 140, an actual yaw rate detector 150, and a yaw moment calculator 160. Some or all of the above devices may be implemented by a processor executing a program. Furthermore, some or all of the above devices may be implemented by hardware such as large scale integration (LSI) or an application specific integrated circuit (ASIC), or may be implemented through a combination of software and hardware, and the present embodiment does not limit its implementation.

The vehicle speed detector 110 is, for example, a vehicle speed sensor, and is configured to detect a vehicle speed V of the vehicle. The vehicle speed detector 110 may transmit the detected vehicle speed V to each of a front wheel steering angle limit value calculation unit 141 and a planar two degree-of-freedom two-wheel model 144 in the standard yaw rate calculator 140.

The travel road surface condition estimator 120 is configured to estimate a road friction coefficient $\mu$ of a road surface on which the vehicle travels, and transmit the estimated road friction coefficient $\mu$ to the front wheel steering angle limit value calculation unit 141 in the standard yaw rate calculator 140. In some embodiments, the travel road surface condition estimator 120 may estimate the road friction coefficient according to a slip ratio calculated from a difference in rotational speed between a drive wheel and a non-drive wheel of the vehicle. In other embodiments, the travel road surface condition estimator 120 may further estimate the road friction coefficient according to a detection value such as a road reaction force acting on each wheel, a lateral acceleration of the vehicle, and a change rate of a yaw rate. The present embodiment does not limit how the road friction coefficient is estimated.

The front wheel steering angle detector 130 is, for example, a steering angle sensor disposed on a front wheel of the vehicle, and is configured to detect a front wheel steering angle $\delta$ of the vehicle and transmit the detected front wheel steering angle $\delta$ to the front wheel steering angle limit value calculation unit 141 in the standard yaw rate calculator 140.

The standard yaw rate calculator 140 is configured to set a rear wheel sideslip angle limit value of the vehicle, calculate a front wheel steering angle limit value according to the vehicle speed, the road friction coefficient and the rear wheel sideslip angle limit value, and calculate a standard yaw rate based on the front wheel steering angle and the vehicle speed, in which the front wheel steering angle is limited by the front wheel steering angle limit value.

In detail, the standard yaw rate calculator 140 includes the front wheel steering angle limit value calculation unit 141, a negative value calculation unit 142, a steering angle limiting unit 143, and the planar two degree-of-freedom two-wheel model 144. The front wheel steering angle limit value calculation unit 141 receives the vehicle speed V provided by the vehicle speed detector 110, the road friction coefficient $\mu$ provided by the travel road surface condition estimator 120, and a rear wheel sideslip angle limit value $\beta$rlim set by a user, and accordingly calculates a front wheel steering angle limit value $\delta$lim.

Figure 2:
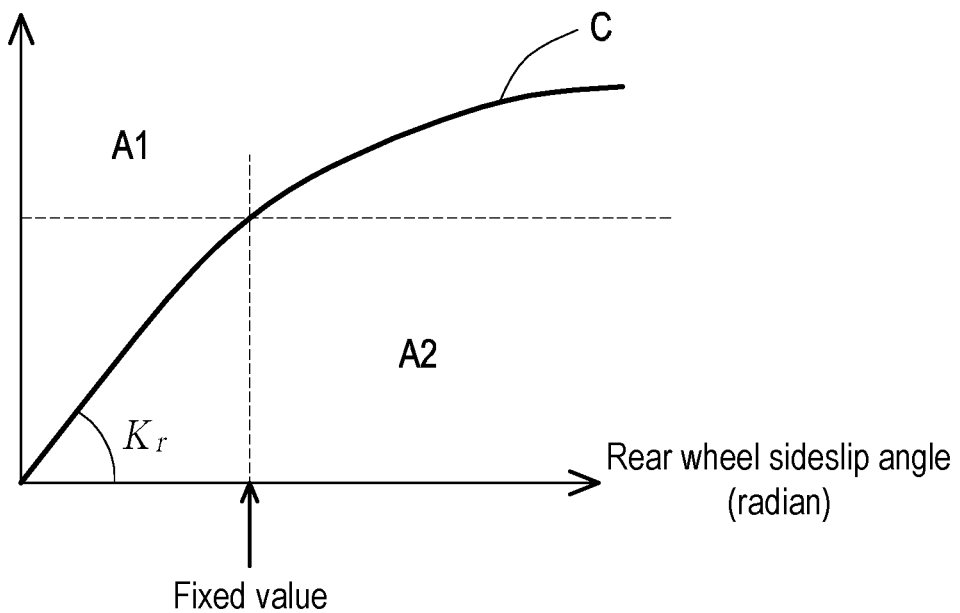
FIG. 2 illustrates a schematic diagram of setting a rear wheel sideslip angle limit value according to one embodiment of the disclosure.

FIG. 2 illustrates a schematic diagram of setting a rear wheel sideslip angle limit value according to one embodiment of the disclosure. Referring to FIG. 2, a graph 200 illustrates a relationship between rear wheel lateral force and rear wheel sideslip angle based on tire characteristics of a rear wheel of the vehicle, in which the horizontal axis indicates the rear wheel sideslip angle in radians, and the vertical axis indicates the rear wheel lateral force in newtons (N). A curve C is a change curve of the rear wheel lateral force relative to the rear wheel sideslip angle of the vehicle. An angle Kr between the curve C and the horizontal axis indicates cornering stiffness of the rear wheel, in units of newtons per radian (N/rad).

The curve C divides the graph 200 into an area A1 and an area A2. In the area A1, since the rear wheel lateral force is generated relative to the rear wheel sideslip angle, unstable behavior is less likely to occur. In the area A2, since the rear wheel lateral force is less likely to be generated relative to the rear wheel sideslip angle, unstable behavior is very likely to occur. The user may take into consideration the tire characteristics described above and set a fixed value as a rear wheel sideslip angle limit value for the rear wheel sideslip angle. In some embodiments, the fixed value described above may vary depending on a travel mode of the vehicle. For example, in a sport mode, the fixed value may be changed to allow for slightly unstable behavior.

Figure 3:
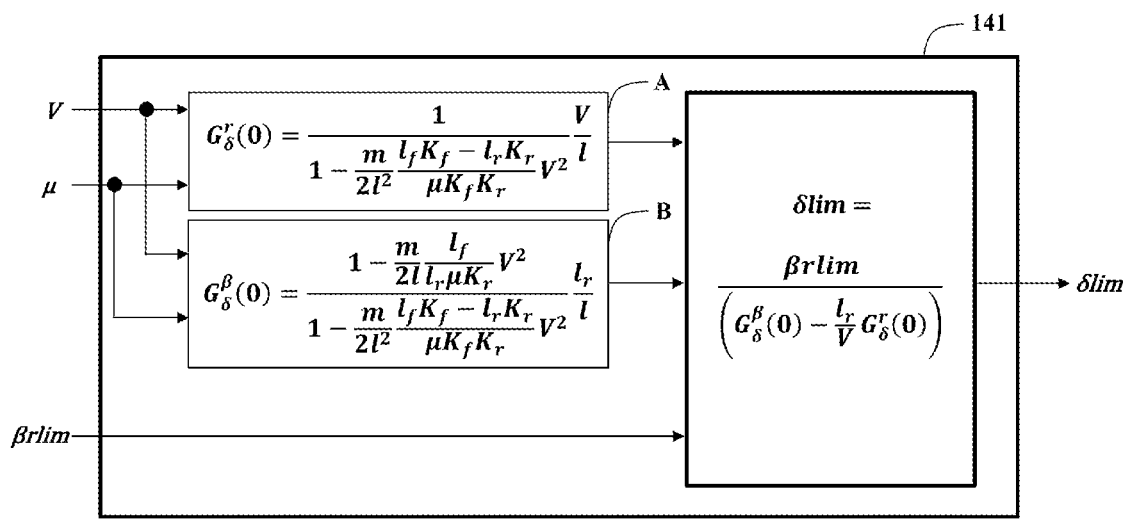
FIG. 3 illustrates a schematic block diagram of a front wheel steering angle limit value calculation unit according to one embodiment of the disclosure.

FIG. 3 illustrates a schematic block diagram of a front wheel steering angle limit value calculation unit according to one embodiment of the disclosure. Referring to FIG. 3, after receiving the vehicle speed V and the road friction coefficient $\mu$, the front wheel steering angle limit value calculation unit 141 may calculate a transfer characteristic $G_\delta^r(0)$ and a transfer characteristic $G_\delta^\beta(0)$ using equation A and equation B (see below), respectively. Then, the front wheel steering angle limit value calculation unit 141 may calculate the front wheel steering angle limit value $\delta$lim using a deviation between the transfer characteristics $G_\delta^r(0)$ and $G_\delta^{\beta2}(0)$ and the rear wheel sideslip angle limit value βrlim.

$$G_\delta^r(0) = \frac{1}{1 - \frac{m}{2l^2}\frac{l_f K_f - l_r K_r}{\mu K_f K_r}V^2}\frac{V}{l} \quad \text{Equation A}$$

$$G_\delta^\beta(0) = \frac{1 - \frac{m}{2l}\frac{l_f}{l_r \mu K_r}V^2}{1 - \frac{m}{2l^2}\frac{l_f K_f - l_r K_r}{\mu K_f K_r}V^2}\frac{l_r}{l} \quad \text{Equation B}$$

In the above, m represents vehicle weight, in kilograms (Kg); $K_f$ represents front wheel steering stiffness (N/rad); $K_r$ represents rear wheel steering stiffness (N/rad); l represents wheelbase of the vehicle, in meters (m); $l_f$ represents a distance (m) from the center of gravity to a front axle of the vehicle; $l_r$ represents a distance (m) from the center of gravity to a rear axle of the vehicle; r represents a yaw rate (N/rad); and β represents a vehicle center-of-gravity sideslip angle (rad).

In detail, a rear wheel sideslip angle βr of the vehicle can be calculated using the vehicle center-of-gravity sideslip angle β and the yaw rate r, as expressed in the following equation:

$$\beta_r = \beta - \frac{l_r}{V}r$$

In a stable state, the vehicle center-of-gravity sideslip angle β and the yaw rate r in the above equation can be rewritten using the transfer characteristics $G_\delta^\beta(0)$ and $G_\delta^r(0)$, as follows:

$$\beta_r = G_\delta^\beta(0)\delta - \frac{l_r}{V}G_\delta^r(0)\delta$$
$$= \left(G_\delta^\beta(0) - \frac{l_r}{V}G_\delta^r(0)\right)\delta$$

By expressing the front wheel steering angle δ using the set rear wheel sideslip angle limit value βrlim, the following equation can be obtained:

$$\delta = \frac{\beta_r}{\left(G_\delta^\beta(0) - \frac{l_r}{V}G_\delta^r(0)\right)}$$

In the above, the actual front wheel steering angle δ when the rear wheel sideslip angle βr is the set rear wheel sideslip angle limit value βrlim can be determined by the above equation. In the case where the rear wheel sideslip angle βr to be limited is replaced with the rear wheel sideslip angle limit value βrlim, since the actual front wheel steering angle δ has been determined at this time, if the steering angle is kept within this range, the rear wheel sideslip angle βr will not exceed the rear wheel sideslip angle limit value βrlim. Accordingly, the front wheel steering angle limit value calculation unit 141 may output the determined actual front wheel steering angle δ as the front wheel steering angle limit value.

Accordingly, in the present embodiment, the front wheel steering angle limit value can be easily calculated using the vehicle speed, the road friction coefficient, and the rear wheel sideslip angle limit value, and thus, unstable behavior on a road having a low friction coefficient can be quickly prevented.

Referring back to FIG. 1, after calculating the front wheel steering angle limit value δlim, the front wheel steering angle limit value calculation unit 141 transmits the front wheel steering angle limit value δlim to each of the negative value calculation unit 142 and the steering angle limiting unit 143. For example, the front wheel steering angle limit value δlim output from the front wheel steering angle limit value calculation unit 141 may be converted into a negative value by the negative value calculation unit 142. Then, the negative value may be transmitted to the steering angle limiting unit 143 together with the original front wheel steering angle limit value δlim, and the front wheel steering angle δ provided by the front wheel steering angle detector 130 is limited by the steering angle limiting unit 143.

In detail, the steering angle limiting unit 143, for example, limits the front wheel steering angle δ within a range between the positive value and the negative value of the front wheel steering angle limit value δlim, and transmits the front wheel steering angle δ limited by the front wheel steering angle limit value δlim to the planar two degree-of-freedom two-wheel model 144.

The planar two degree-of-freedom two-wheel model 144 calculates a standard yaw rate $r_{ref}$ based on the front wheel steering angle δ limited by the front wheel steering angle limit value δlim and the vehicle speed V, and transmits the calculated standard yaw rate $r_{ref}$ to the yaw moment calculator 160. A calculation equation of the standard yaw rate $r_{ref}$ is as follows:

$$r_{ref} = G_\delta^r(0) \cdot \delta$$

In the above, $G_\delta^r(0)$ is the transfer characteristic calculated by equation A in FIG. 3, and δ is the limited front wheel steering angle.

In some embodiments, the standard yaw rate calculator 140 may set the front wheel steering angle limit value to increase as the rear wheel sideslip angle limit value increases. Accordingly, by setting a relatively large front wheel steering angle limit value as the rear wheel sideslip angle limit value increases and calculating the standard yaw rate using this front wheel steering angle limit value, unstable behavior of the vehicle on a road having a low friction coefficient can be quickly prevented.

On the other hand, in the vehicle attitude control device 100, an actual yaw rate $r_{act}$ of the vehicle is detected by, for example, the actual yaw rate detector 150, and the actual yaw rate $r_{act}$ is transmitted to the yaw moment calculator 160.

Finally, the yaw moment calculator 160 generates a yaw moment based on a deviation between the actual yaw rate $r_{act}$ and the standard yaw rate $r_{ref}$.

In summary, in the vehicle attitude control device of the disclosure, the front wheel steering angle is limited based on the rear wheel sideslip angle limit value, and the standard yaw rate is calculated based on the front wheel steering angle and the vehicle speed. Thereby, the vehicle can be prevented from becoming unstable due to an excessively large yaw moment on a road having a low friction coefficient. Furthermore, compared to the case of using a lateral acceleration sensor, responsiveness of the vehicle can be improved, which may contribute to the development of a sustainable transportation system.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle attitude control device comprising:
 a vehicle speed detector, detecting a vehicle speed of a vehicle;
 a travel road surface condition estimator, estimating a road friction coefficient;
 an actual yaw rate detector, detecting an actual yaw rate of the vehicle;
 a front wheel steering angle detector, detecting a front wheel steering angle of the vehicle;
 a standard yaw rate calculator, setting a rear wheel sideslip angle limit value of the vehicle, calculating a front wheel steering angle limit value according to the vehicle speed, the road friction coefficient and the rear wheel sideslip angle limit value, and calculating a standard yaw rate based on the front wheel steering angle and the vehicle speed, in which the front wheel steering angle is limited by the front wheel steering angle limit value; and
 a yaw moment calculator, generating a yaw moment based on a deviation between the actual yaw rate and the standard yaw rate.

2. The vehicle attitude control device according to claim 1, wherein
 the standard yaw rate calculator sets the front wheel steering angle limit value to increase as the rear wheel sideslip angle limit value increases.

3. The vehicle attitude control device according to claim 1, wherein
 the standard yaw rate calculator calculates the front wheel steering angle limit value using a deviation between a plurality of transfer characteristics according to the vehicle speed and the road friction coefficient and the rear wheel sideslip angle limit value.

* * * * *